(12) United States Patent
Hamberger et al.

(10) Patent No.: US 9,990,042 B2
(45) Date of Patent: Jun. 5, 2018

(54) SENSOR AND TAG TO DETERMINE A RELATIVE POSITION

(71) Applicant: HEWLETT-PACKARD DEVELOPMENT COMPANY, L.P., Houston, TX (US)

(72) Inventors: Karl Fredrik Hamberger, Sunnyvale, CA (US); Robert Campbell, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 14/786,297

(22) PCT Filed: Jul. 10, 2013

(86) PCT No.: PCT/US2013/049942
§ 371 (c)(1),
(2) Date: Oct. 22, 2015

(87) PCT Pub. No.: WO2015/005919
PCT Pub. Date: Jan. 15, 2015

(65) Prior Publication Data
US 2016/0109956 A1    Apr. 21, 2016

(51) Int. Cl.
| | | |
|---|---|---|
| *G06F 3/041* | (2006.01) | |
| *G06F 3/01* | (2006.01) | |
| *G06F 3/042* | (2006.01) | |
| *G09G 5/00* | (2006.01) | |

(52) U.S. Cl.
CPC .............. *G06F 3/017* (2013.01); *G06F 3/011* (2013.01); *G06F 3/042* (2013.01); *G09G 5/003* (2013.01); *G09G 2370/04* (2013.01)

(58) Field of Classification Search
CPC ................ G06F 3/04883; G06F 3/017; G06F 2203/04808; G06F 3/04886; G06F 3/0428; G06F 3/0426; G06F 3/0321; G06F 3/0346; G06F 1/1628; G06F 3/0416; G06F 3/04842; G06F 17/30241; G06F 1/163; G06F 3/03545; G06F 3/1204; G06F 3/03542; G06F 3/0386
USPC ................................ 345/156, 169, 173–175
See application file for complete search history.

(56) References Cited

U.S. PATENT DOCUMENTS

| | | |
|---|---|---|
| 5,594,469 A | 1/1997 | Freeman |
| 6,280,212 B1 | 8/2001 | Nguyen et al. |
| 6,353,529 B1 | 3/2002 | Cies |
| 7,383,991 B2 * | 6/2008 | Silverbrook ............ G06F 3/014 235/385 |
| 7,834,855 B2 * | 11/2010 | Hotelling .............. G06F 1/1616 345/169 |

(Continued)

FOREIGN PATENT DOCUMENTS

| | | |
|---|---|---|
| JP | 2006153828 A | 6/2006 |
| KR | 10-2012-0117063 | 10/2012 |

(Continued)

*Primary Examiner* — Duc Q Dinh
(74) *Attorney, Agent, or Firm* — HPI Patent Department (57) ABSTRACT

A computing device can include a first enclosure and a display enclosure. A tag can be on the first enclosure. A sensor on the display enclosure can detect the tag location and generate sensor data. A controller can determine from the sensor data the relative position between the display enclosure and the first enclosure.

19 Claims, 6 Drawing Sheets

(56) References Cited

U.S. PATENT DOCUMENTS

| | | | |
|---|---|---|---|
| 7,911,532 B2 * | 3/2011 | Pai | H04N 1/00002 |
| | | | 348/376 |
| 8,152,071 B2 | 4/2012 | Doherty et al. | |
| 8,363,098 B2 | 1/2013 | Rosener et al. | |
| 8,427,296 B2 | 4/2013 | Pance et al. | |
| 2009/0139778 A1 | 6/2009 | Butler et al. | |
| 2009/0200384 A1 | 8/2009 | Masalkar | |
| 2010/0103103 A1 * | 4/2010 | Palanker | G06F 3/023 |
| | | | 345/158 |
| 2010/0103141 A1 | 4/2010 | Challener | |
| 2010/0294938 A1 | 11/2010 | Alameh et al. | |
| 2010/0321275 A1 | 12/2010 | Hinckley | |
| 2012/0062758 A1 | 3/2012 | Devine et al. | |
| 2012/0064971 A1 * | 3/2012 | Devine | A63F 13/42 |
| | | | 463/31 |
| 2012/0086658 A1 | 4/2012 | Moradian | |
| 2012/0235912 A1 | 9/2012 | Laubach | |
| 2012/0256929 A1 | 10/2012 | Koenig | |
| 2012/0312962 A1 | 12/2012 | Hebert | |
| 2012/0320216 A1 | 12/2012 | Mkrtchyan | |
| 2013/0113920 A1 | 5/2013 | Blanton | |

FOREIGN PATENT DOCUMENTS

| | | |
|---|---|---|
| TW | M451589 U | 4/2013 |
| WO | WO-0030023 A1 | 5/1997 |
| WO | WO-9915982 A1 | 4/1999 |
| WO | WO-2010079101 A2 | 7/2010 |
| WO | WO-2011085815 A1 | 7/2011 |
| WO | WO-2013029460 A1 | 3/2013 |

\* cited by examiner

SENSOR AND TAG TO DETERMINE A RELATIVE POSITION

BACKGROUND

Gesture recognition can be seen as a way for computers to begin to understand human body language, thus building a richer bridge between machines and humans than other human computer interfaces which may be limited to input by a keyboard or mouse. Gesture recognition enables a user to communicate with the computer and interact naturally without the keyboard or mouse.

BRIEF DESCRIPTION OF THE DRAWINGS

Some examples of the invention are described with respect to the following figures.

DETAILED DESCRIPTION

A sensor may be able to detect movement of an object such as a user's hands. These movements can be interpreted by a computer as a gesture. A user may perform gestures in a different way than another user, the gestures may be performed by different size hands and in different volumes of space due to the user's arm length for example. The variables in how a gesture is performed can make gestures difficult to interpret properly.

Two similar gestures may cause different actions to be performed by the computing device, if the computing device interprets a gesture as another gesture then the action the user intended by the gesture would not be performed and another action would be performed. For example if a first gesture for closing a program was similar to the gesture for saving a document the user may intend for the computing system to save the document and instead the computing system closes the program.

A sensor for gesture detection may need to be oriented towards a user to detect the gesture performed by the user. If the sensor has a large field of view the computing device may restrict the gesture input to a volume to allow more accurate detection and interpretation of the gesture. For example if a sensor has a field of view of 170 degrees the field of view may be restricted from 30-60 degrees and range from the sensor such as from 20 to 50 centimeters from the sensor.

If the sensor is separate from the computing device the sensor can be placed in any location. For example the sensor may be placed on a surface such as a desk or clipped to a display and adjusted toward a user looking at the display. The sensor can be mounted in a computing device for example a tablet computing device, an all in one (AIO), a hybrid computing device such as a notebook with a removable tablet, a notebook, or another device. If the sensor is mounted in the computing device the position of the sensor may be dependent on the position of the device. For example if the device is a hybrid device the sensor may be in the tablet so that it could be used without the keyboard dock however when the tablet is connected to the keyboard dock the relative position between the tablet and the keyboard dock is variable and may be adjusted according to how it is used such as on a desk or on a user's lap. In another example an AIO computing device maybe moved around a user's house and the AIO may determine where the user is to be able to determine gestures accurately.

A tag can be placed on an object to orient the sensor to where the gestures would likely be performed. A tag is something that provides identification or other information. A tag or may be a label, a sticker, printed on an enclosure or another type of tag. For example in a hybrid system or an AIO the gestures would likely be performed by a user above an input device such as the keyboard. Therefore the tags that can be detected by the sensory be placed on the enclosure of the input device.

In one example, a computing device includes a first enclosure and a display enclosure. A tag can be on the first enclosure. A sensor on the display enclosure can detect the tag location and generate sensor data. A controller can determine from the sensor data the relative position between the display enclosure and the first enclosure. The relative position between the display enclosure and first enclosure can be used to determine the likely volume for gestures.

In another example, a system includes a tablet computing device. An IR sensor in the tablet computing device can generate IR sensor data from an object moving in a volume. A connector can couple the tablet computing device to a docking station. A controller in the tablet computing device can determine relative position between the docking station and the tablet computing device from a tag in the IR sensor data.

In another example, a non-transitory computer readable medium includes code that if executed by a controller in a computing device may cause the controller receive IR sensor data from an IR sensor. The controller may determine a relative position of IR tags from the IR sensor data. The controller may determine from the relative position of the IR tags an enclosure relative position between an enclosure and a first enclosure. The controller may determine the gesture input volume based on the relative position between the enclosure and the first enclosure.

Figure 1:
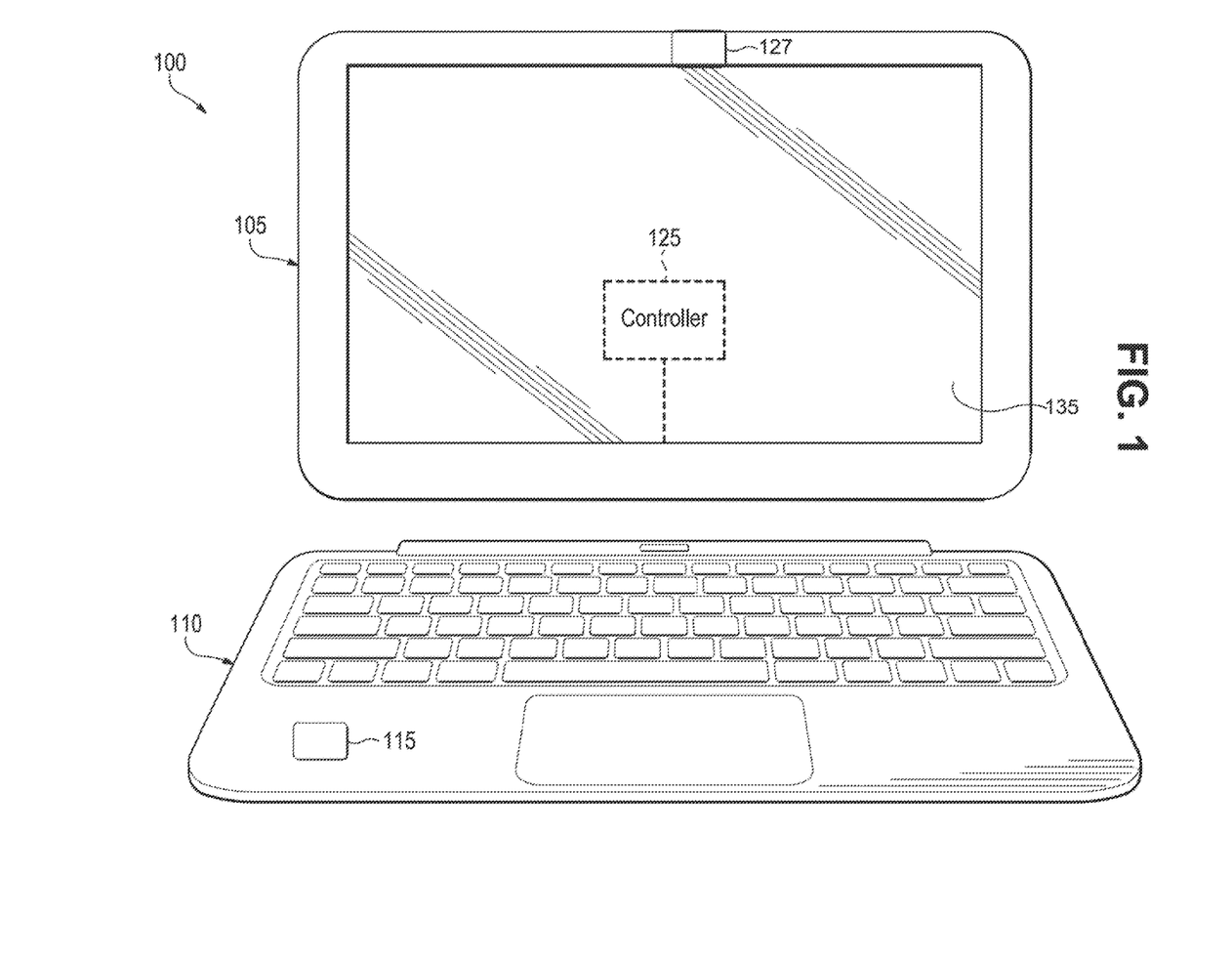
FIG. 1 is a computing device according to an example implementation.

With reference to the figures, FIG. 1 is a computing device 100 according to an example implementation. A computing device 100 includes a first enclosure 110 and a display enclosure 105. The display enclosure may include a display 135. A tag 115 can be on the first enclosure 110. The tag 115 can be a bar code, a QR (Quick Response Code), a shape such as a rectangle or triangle for example, or another tag. The tag 115 may include some type of identifying code to identify the first enclosure 110. For example the first enclosure may be an enclosure for a keyboard, a docking station, a tablet computing device, a surface of a desk, or another enclosure. The tag may indicate the manufacture, model number, revision number, country origin, or other additional information. The 15 may also uniquely identify the first enclosure so that if the sensor has multiple tags that identify multiple first enclosure in the field of view of the sensor 127 the computing device can identify which first enclosure is connected to the computing device. For example if two computing devices are next to each other on a desk the sensor may have a field of view that includes the keyboards of both of the of the computing devices then the keyboard connected to the device with the sensor can identify itself to the computing device through an EDID (electronic device identification) and a corresponding ID number can be in the tag 115 on the keyboard so that the computing device can determine which of the keyboards in the field of view of the sensor is the keyboard connected to the computing device.

The tag may include data such as when the tag is a QR code or may have to be compared to data in a database such as in the case of a bar code. The tag 115 may be visible such that it reflects visible light or may be invisible to a user such that is reflects IR (infrared). The tag 115 may have alignment portions, the alignment portions of the tag 115 may be used to determine the relative position of the first enclosure.

A sensor 127 on the display enclosure can detect the tag 115 location and generate sensor data. The sensor 127 may be an IR sensor and the sensor 127 include an IR transmitter to generate IR light to the area that can be viewed by the sensor. The sensor 127 may be a time of flight sensor, a structured light sensor, or another type of IR sensor. The sensor 127 can generate data based on objects that reflect IR. For example a user's hands performing a gesture in view of the sensor reflect the IR from the transmitter back to the IR sensor. The IR sensor can also detect the reflection off of the tag 115 of the IR light from the IR transmitter.

A controller 125 can determine from the sensor data the relative position between the display enclosure 105 and the first enclosure 110. The controller may be a general purpose processor, an ASIC (application specific integrated circuit), or another type of the controller. The controller 125 may include multiple processing cores in the one or multiple packages. In one example some of the processing of the sensor data may be done by a processor for the sensor and the results of that processing may be sent to the processor of the computing device. In one example the controller for the computing device may do the processing of the sensor data.

The processing of the sensor data can determine the relative position between the display enclosure and first enclosure. For example in a hybrid computing device the relative position may be the angle between the tablet portion and the keyboard docking station of the hybrid computing device. In one example an AIO can detect the position of a first enclosure such as a keyboard for the AIO on a desk. The relative position of the first enclosure may include not only to angle between the AIO and the first enclosure, but also the distance of the keyboard and the skew of the keyboard. The skew is created when the first enclosure such as an input device may not be aligned with the sensor 127 of the computing device. Skew may be the angle to an alignment line and the alignment line may be for example parallel to the display enclosure. The alignment portions of the tag may be used to determine the skew of the keyboard.

The relative position of the first enclosure such as a keyboard or tablet can be used to determine the volume for gestures. For example the user is likely to perform gestures above the keyboard so that the user does not have to reach across the keyboard, move back from the keyboard, move left or move right of the keyboard. The user is also not likely to move their hands more than a few feet above the keyboard such as by standing up to perform the gesture. Knowing the position of the first enclosure the sensor can focus the volume for gesture input data to the volume above the first enclosure. For example the volume may be a 60 centimeter by 60 centimeter by 60 centimeter cube above the first enclosure such as the enclosure for a keyboard.

Figure 2:
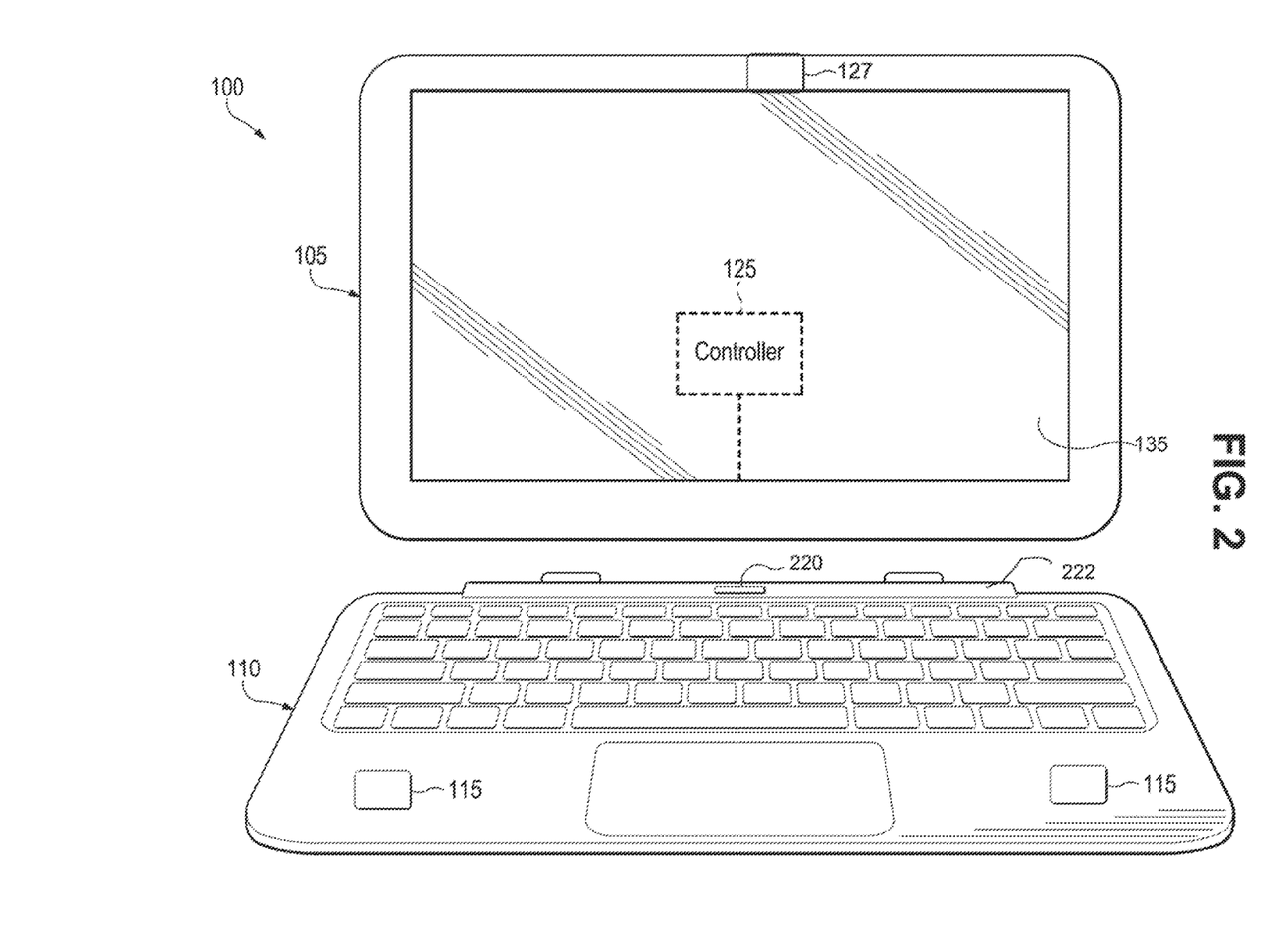
FIG. 2 is a computing device according to an example implementation.

FIG. 2 is a computing device according to an example implementation. The sensor may be an IR sensor and the tag may have IR reflection properties that reflect IR light different than the material surrounding the tag 115. For example the Tag may reflect light with a wave length of 700 nm-1 mm while the surrounding material of the first enclosure may reflect visible light in the 380 nm-700 nm range.

The computing device 100 can include a fastener 220 to remove the display enclosure 105 from the first enclosure 110 when the display enclosure 105 is attached to the first enclosure 110. For example when the computing device is a hybrid computing device the tablet computing device in the display enclosure 105 is removable from the docking station in the first enclosure 110. The fastener 220 can be deactivated by a button, slide or another system to release the display enclosure 105 from the first enclosure 110.

When the device is a portable computing device such as a notebook or hybrid computing device the computing device can include a hinge 222 between the first enclosure 110 and the display enclosure 105 to adjust the display enclosure 105 angle relative to the first enclosure 110. The angle between the display enclosure 105 and the first enclosure 110 can determine the position of an input device such as a keyboard or tablet relative to the sensor 127.

The sensor 127 can determine the location of an object such as a user's hands and the controller 125 can determine a gesture volume from the relative position between the display enclosure 105 and the first enclosure 110. For example as the display enclosure angle is increased from being parallel and in contact with the first enclosure, i.e. a closed clam shell device, to being perpendicular or beyond, i.e. an open clam shell device then the position of the sensor in the display enclosure changes relative to the first enclosure. The sensor 127 and controller 125 can determine where the tag 115 is and therefore determine where the first enclosure 110 is relative to the sensor 127.

In the examples the display enclosure may be the enclosure of a tablet computing device, an AIO, a PDA, a phone, a display enclosure of a notebook computer or the display enclosure of another device. The display enclosure may include components in addition to the display such as a battery, a processor, an input device, input/output ports, and other components. The first enclosure may be an enclosure for a docking station for the display enclosure, an external keyboard, a tablet or may be an enclosure for another device.

Figure 3:
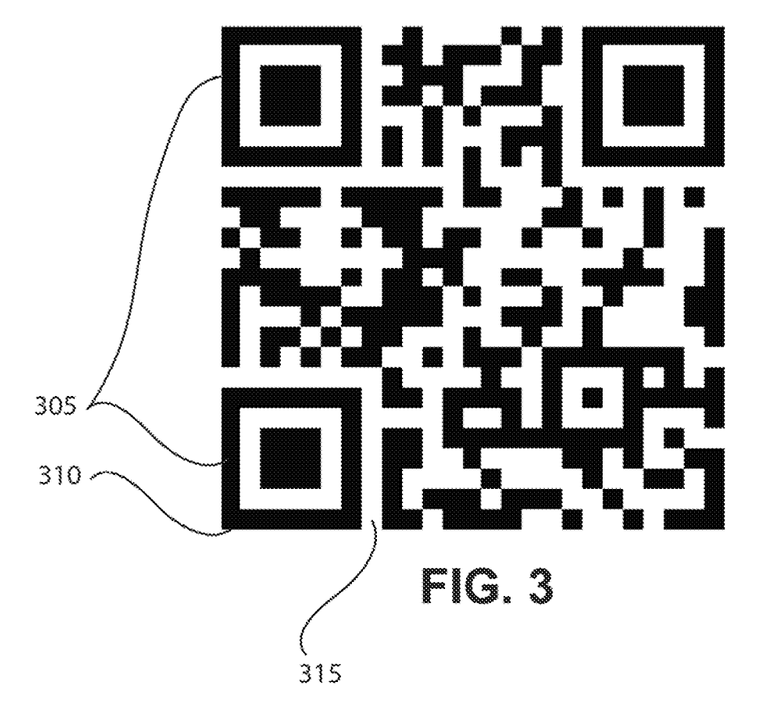
FIG. 3 is a tag according to an example implementation.

FIG. 3 is a tag according to an example implementation. The tag may be in the form of a OR code such as the tag shown. The tag may have area 310 shown in black that are visible to the sensor and areas 315 shown that appear different to a sensor, for example the area 310 may reflect IR light differently than the area 315 so that the tag is not visible in the visual light frequencies. The tag can have an embedded code that can be decoded by the controller. For example the tag shown in the figure when decoded expresses "HP Envy x2 keyboard dock". In addition to embedding data the OR code includes alignment marks in the upper corners and the lower left corner. The alignment marks 305 appear as a square with a boarder. These alignment features can also be used by the controller to determine the skew of the first enclosure by determining how much the alignment marks are skewed.

Figure 4:
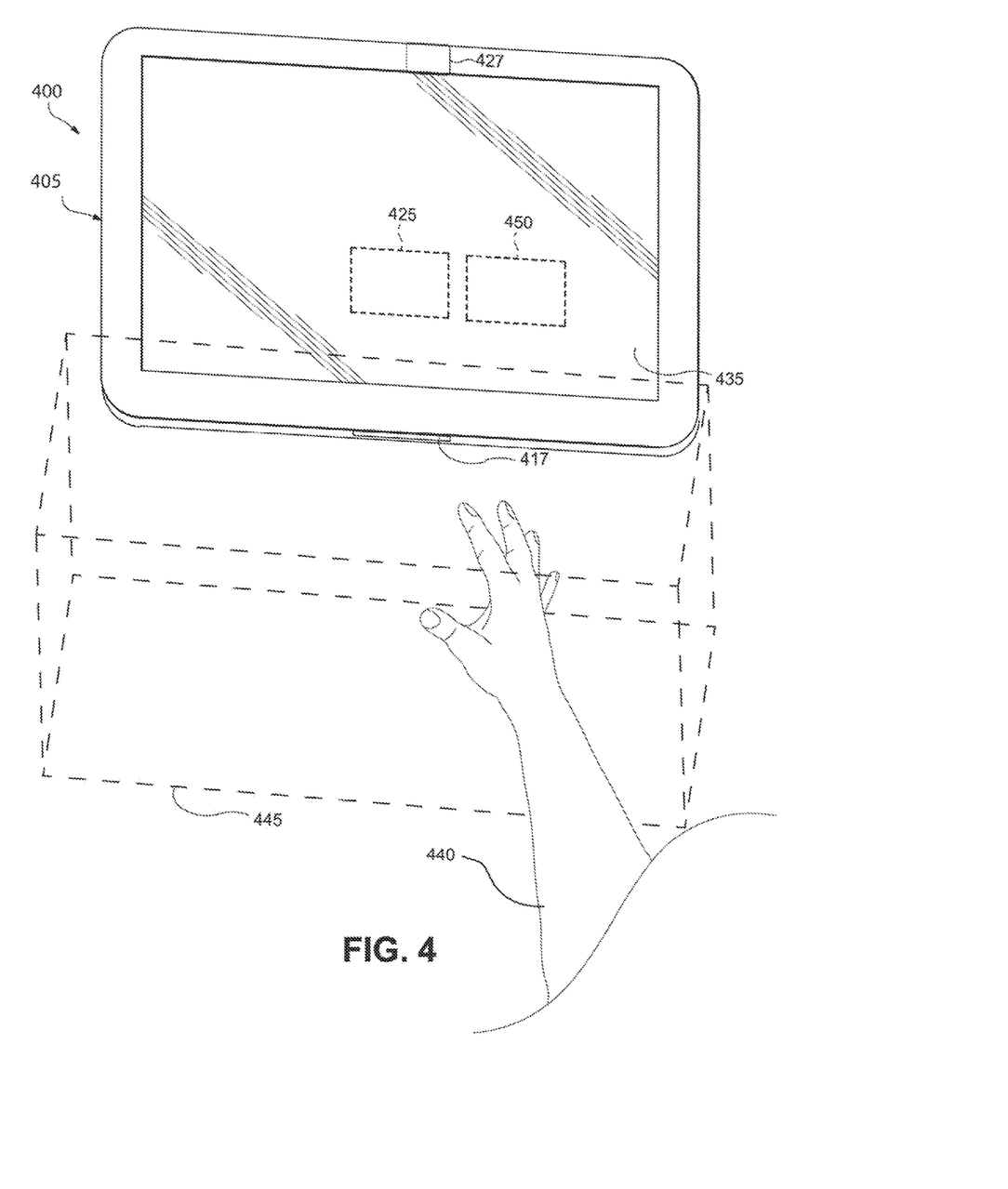
FIG. 4 is a computing device according to an example implementation.

FIG. 4 is a tablet computing device 400 according to an example implementation. An IR sensor 427 can be in the tablet computing device 400. The sensor 427 can generate IR sensor data from an object moving in a volume 445. The object 440 moving in the volume 445 in view of the tablet computing device 400 can be a user's hand or another object.

A connector 417 can couple the tablet computing device to a docking station. The connector 417 can be a fastener to physically couple the tablet computing device to a docking station and may include electrical data, power or both. A controller 425 in the tablet computing device can determine relative position between the docking station and the tablet computing device from data about as tag in the IR sensor data.

The docking station may include a keyboard or another input device. A hinge may connect the tablet computing device to the docking station. The hinge can allow the tablet computing device to pivot relative to the docking station. A gesture module 450 can determine if the object 440 is providing a gesture. The gesture module 450 may be firmware for a processor, an ASIC, software or another type of module. The gesture module 450 may be part of the sensor module, and the gesture module 450 may send to the computing device an identification of the gesture that was determined by the gesture module 450.

Figure 5:
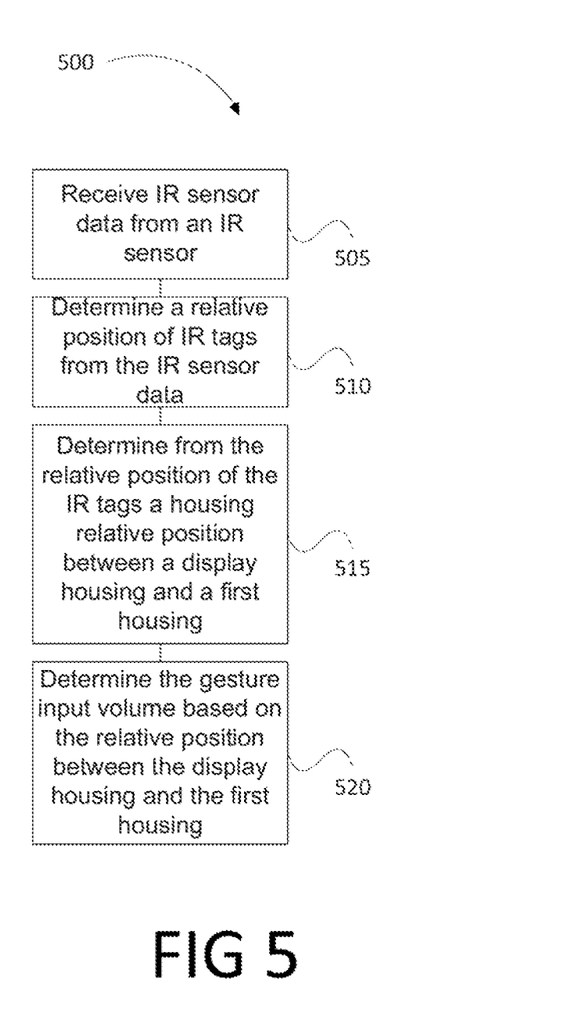
FIG. 5 is a flow chart of a method according to an example implementation.

FIG. 5 is a flow chart of a method 500 according to an example implementation. The method can begin by receiving IR sensor data from an IR sensor at 505. The controller may then determine a relative position of IR tags from the IR sensor data 510. The controller may determine from the relative position of the IR tags an enclosure relative position between a display enclosure and a first enclosure at 515. The controller may then determine the gesture input volume based on the relative position between the display enclosure and the first enclosure at 520.

The computing device can determine the gesture performed by a use in the volume. An instruction related to a gesture detected in the gesture input volume by the IR sensor for example if the gesture was to execute an instruction to save the document or if the gesture was to close the application that was opened.

Figure 6:
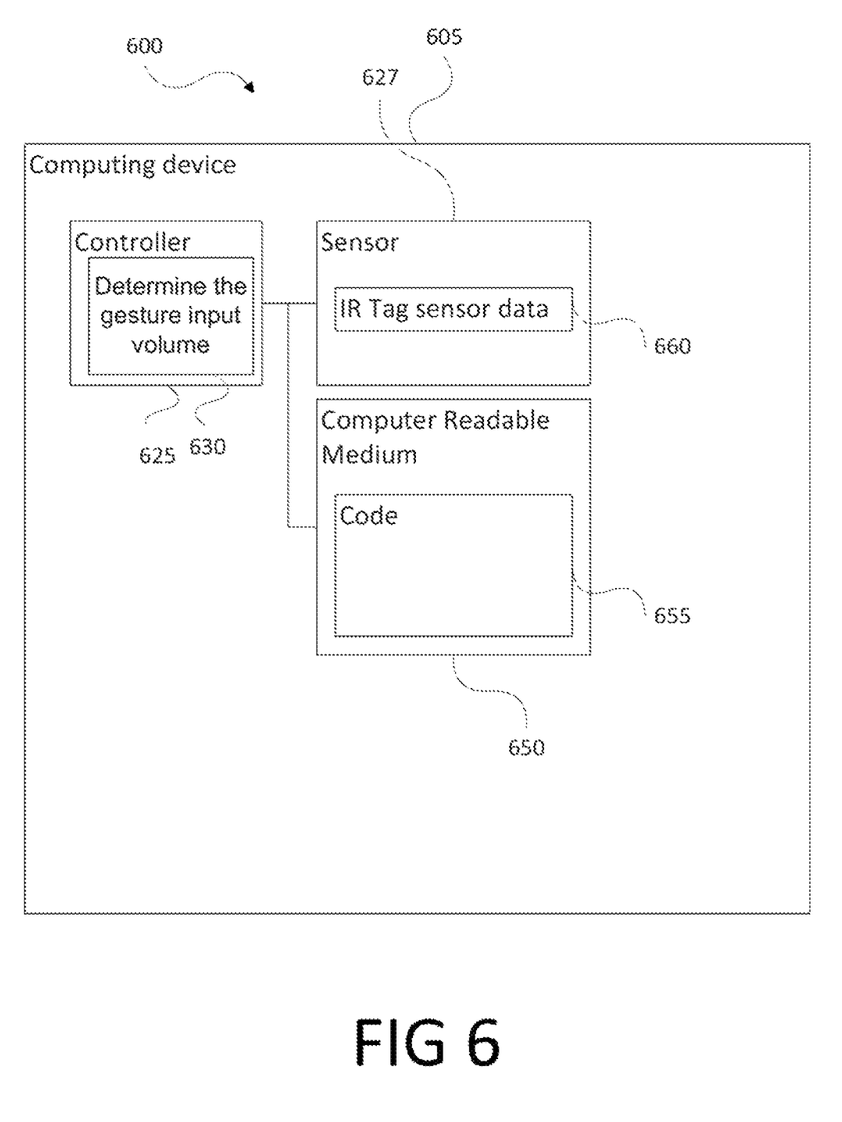
FIG. 6 is a computing system including computer readable medium according to an example implementation.

FIG. 6 is a computing device 600 including an enclosure 605 and a computer readable medium 650 according to an example implementation. A non-transitory computer readable medium 650 includes code 655 that if executed by a controller 625 in a computing device 600 may cause the controller 625 receive IR sensor data 660 from an IR sensor 627. The controller 625 may determine a relative position of IR tags from the IR sensor data 660. The controller may determine from the relative position of the IR tags an enclosure relative position between an enclosure 605 and a first enclosure. The controller 625 may determine the gesture input volume 630 based on the relative position between the enclosure 605 and the first enclosure. The controller 625 may execute an instruction related to a gesture detected in the gesture input volume by the IR sensor.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

It is to be understood that the phraseology and terminology used herein is the purpose of description and should not be regarded as limiting. The use of "comprising", "including" or "having" are synonymous and variations thereof herein is meant to encompass the items listed thereafter and equivalents thereof as well as additional items. It should also be noted that a plurality of hardware and software based devices, as well as a plurality of different structural components may be used to implement the disclosed methods and systems.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
    a first enclosure;
    a second enclosure;
    an IR tag on the first enclosure;
    an IR sensor on the second enclosure to detect an IR tag location on the first enclosure and generate IR sensor data; and
    a controller to:
        determine a restricted field of view from a field of view for the IR sensor;
        determine a position of the first enclosure;
        determine from the IR sensor data a relative position between the second enclosure and the first enclosure;
        determine a gesture volume from:
            the relative position between the second enclosure and the first enclosure; and
            the restricted field of view for the IR sensor;
        determine when an object within the gesture volume is providing a gesture; and
        execute an instruction based on a provided gesture.

2. The device of claim 1, wherein the tag reflects IR light different than a material surrounding the tag.

3. The device of claim 1, further comprising a fastener to remove the second enclosure from the first enclosure when the second enclosure is attached to the first enclosure.

4. The device of claim 1, a hinge between the first enclosure and the second enclosure to adjust the second enclosure angle relative to the first enclosure.

5. The device of claim 1, wherein the sensor determines a location of a user's hands.

6. The device of claim 1, wherein the second enclosure is a tablet computing device.

7. The device of claim 6, wherein the first enclosure is a docking station of the tablet computing device.

8. The device of claim 1, further comprising a code embedded in the tag that can be decoded by the controller.

9. The device of claim 1, wherein the tag includes an identifying code to uniquely identify the first enclosure.

10. The device of claim 1, wherein the tag indicates at least one of a manufacturer, model number, revision number, and country origin.

11. The device of claim 1, wherein determining a relative position between the second enclosure and the first enclosure comprises determining an angle between the first enclosure and the second enclosure.

12. The device of claim 1, wherein determining a relative position between the second enclosure and the first enclosure comprises determining a distance between the first enclosure and the second enclosure.

13. The device of claim 1, wherein determining a relative position between the second enclosure and the first enclosure comprises determining a skew between the first enclosure and the second enclosure.

14. A system comprising:
a computing device having a first enclosure and a second enclosure;
an IR sensor in the computing device to detect a tag location on the first enclosure and generate IR sensor data;
a controller in the computing device to:
determine a restricted field of view from a field of view for the IR sensor;
distinguish based on the tag, the first enclosure from other enclosures within the field of view of the IR sensor;
determine a position of the first enclosure;
determine relative position between the second enclosure and the first enclosure from the IR sensor data;
determine a gesture volume, which is above the first enclosure and in which user gestures are detected, from:
the relative position between the second enclosure and the first enclosure; and
the restricted field of view for the IR sensor;
determine when an object within the gesture volume is providing a gesture; and
execute an instruction based on a provided gesture.

15. The system of claim 14, wherein the first enclosure comprises a keyboard.

16. The system of claim 14, wherein the IR sensor determines a location of a user's hands within the gesture volume.

17. The system of claim 14, further comprising a processor to determine when the object is providing a gesture.

18. A non-transitory computer readable medium comprising code that when executed by a controller of a computing device in an enclosure causes the controller to:
distinguish, based on a tag on a first enclosure, the first enclosure from other enclosures within the field of view of an IR sensor;
receive IR sensor data from the IR sensor;
determine an angle between the first enclosure and the second enclosure based on the IR sensor data;
determine an amount of skew between the first enclosure and the second enclosure based on alignment marks in the IR tag;
determine a position of the first enclosure;
determine a relative position of IR tags from the IR sensor data;
determine from the relative position of the IR tags an enclosure relative position between a second enclosure and a first enclosure;
determine a restricted field of view from a field of view for the IR sensor;
determine a gesture input volume, which is above the first enclosure and narrower than a field of view of the IR sensor, based on:
the relative position between the second enclosure and the first enclosure; and
the restricted field of view for the IR sensor;
determine when an object within the gesture volume is providing a gesture; and
execute an instruction based on a provided gesture.

19. The computer readable medium of claim 18 further comprising code that when executed causes a controller to:
execute an instruction related to a gesture detected in the gesture input volume by the IR sensor.

* * * * *